(12) United States Patent
Pitteloud et al.

(10) Patent No.: US 8,758,455 B2
(45) Date of Patent: Jun. 24, 2014

(54) PROCESS FOR PRODUCING LITHIUM COMPOSITE METAL OXIDE HAVING LAYERED STRUCTURE

(75) Inventors: Cedric Pitteloud, Muttenz (CH);
Yoshinari Sawabe, Tsukuba (JP);
Satoshi Shimano, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 133 days.

(21) Appl. No.: 13/257,513

(22) PCT Filed: Mar. 18, 2010

(86) PCT No.: PCT/JP2010/055297
§ 371 (c)(1),
(2), (4) Date: Sep. 19, 2011

(87) PCT Pub. No.: WO2010/110402
PCT Pub. Date: Sep. 30, 2010

(65) Prior Publication Data
US 2012/0009459 A1 Jan. 12, 2012

(30) Foreign Application Priority Data

Mar. 23, 2009 (JP) ................................. 2009-069547
Dec. 7, 2009 (JP) ................................. 2009-277248

(51) Int. Cl.
*H01M 4/505* (2010.01)
*H01M 4/525* (2010.01)
*H01M 10/052* (2010.01)
*C01G 53/00* (2006.01)

(52) U.S. Cl.
USPC .................... 29/623.1; 429/218.1; 429/231.1; 423/594.15; 423/594.2; 423/594.4; 423/594.6; 252/182.1

(58) Field of Classification Search
USPC ......... 29/623.1; 252/182.1; 429/218.1, 231.1; 423/594.15, 594.2, 594.4, 594.6
See application file for complete search history.

(56) References Cited

U.S. PATENT DOCUMENTS

2011/0059363 A1    3/2011   Imanari et al.

FOREIGN PATENT DOCUMENTS

| JP | 10-324521 A | 12/1988 |
|---|---|---|
| JP | 07-326356 A | 12/1995 |
| JP | 08208231 A | * 8/1996 |
| JP | 11-219706 A | 8/1999 |
| JP | 2000331680 A | * 11/2000 |
| JP | 2001084998 A | * 3/2001 |
| JP | 2001-192210 A | 7/2001 |
| JP | 2003-068306 A | 3/2003 |
| JP | 2003-092108 A | 3/2003 |
| JP | 2003-151546 A | 5/2003 |
| JP | 2004-323331 A | 11/2004 |
| JP | 2009-032655 A | 2/2009 |
| JP | 2010-040383 A | 2/2010 |
| JP | 2010-055778 A | 3/2010 |
| JP | 2001-048545 A | 2/2011 |

OTHER PUBLICATIONS

IPDL Machine Translation of JP 2001-084998A (Mar. 2001).*
IPDL Machine Translation of JP 2000-331680A (Nov. 2000).*
IPDL Machine Translation of JP 2004-323331A (Nov. 2004).*
International Search Report dated Mar. 23, 2009, issued in PCT/JP2010/055297.
Machine generated translation of JP 2010-040383 previously submitted.
Machine generated translation of JP 2010-055778 previously submitted.
Machine generated translation of JP 2003-151546 previously submitted.
Machine generated translation of JP 2004-323331 previously submitted.
Machine generated translation of JP 2003-068306 previously submitted.
Machine generated translation of JP 2003-092108 previously submitted.

* cited by examiner

*Primary Examiner* — Gregg Cantelmo
(74) *Attorney, Agent, or Firm* — Sughrue Mion, PLLC

(57) ABSTRACT

A method of producing a layered structure lithium mixed metal oxide, including a step of calcining a lithium mixed metal oxide raw material containing a transition metal element and a lithium element in a molar ratio of the lithium element to the transition metal element of 1 or more and 2 or less, in the presence of an inactive flux containing one or more compounds selected from the group consisting of a carbonate of M, a sulfate of M, a nitrate of M, a phosphate of M, a hydroxide of M, a molybdate of M, and a tungstate of M, wherein M represents one or more elements selected from the group consisting of Na, K, Rb, Cs, Ca, Mg, Sr and Ba.

6 Claims, No Drawings

PROCESS FOR PRODUCING LITHIUM COMPOSITE METAL OXIDE HAVING LAYERED STRUCTURE

CROSS REFERENCE TO RELATED APPLICATIONS

This application is a National Stage of International Application No. PCT/JP2010/055297 filed Mar. 18, 2010, claiming priority based on Japanese Patent Application No. 2009-069547 filed Mar. 23, 2009 and Japanese Patent Application No. 2009-277248 filed Dec. 7, 2009, the contents of all of which are incorporated herein by reference in their entirety.

TECHNICAL FIELD

The present invention relates to a method of producing a layered structure lithium mixed metal oxide. More particularly, the present invention relates to a method of producing a layered structure lithium mixed metal oxide used in a positive electrode active material for a nonaqueous electrolyte secondary battery.

BACKGROUND ART

A layered structure lithium mixed metal oxide is used as positive electrode active materials in nonaqueous electrolyte secondary batteries, such as a lithium secondary battery. The lithium secondary battery has already been put into practical use as a power source for portable telephones, notebook-sized personal computers, and the like, and also attempted to be used in medium and large size applications, such as applications of use for automobiles or electric power storages.

A conventional method of producing a layered structure lithium mixed metal oxide is described in JP-A-07-326356, which describes a method of obtaining a layered structure lithium nickelate as a layered structure lithium mixed metal oxide by calcining a lithium mixed metal oxide raw material including a mixture of nickel carbonate and lithium nitrate in the presence of an active flux made of LiCl.

DISCLOSURE OF THE INVENTION

Incidentally, in nonaqueous electrolyte secondary batteries used, for example, for automobile or for power tools, such as electric tools, high output is required to be exhibited at a high current rate. An object of the present invention is to provide a method of producing a layered structure lithium mixed metal oxide, by which a nonaqueous electrolyte secondary battery capable of exhibiting high output at a high current rate can be provided.

The present invention provides the followings.
<1> A method of producing a layered structure lithium mixed metal oxide, including a step of calcining a lithium mixed metal oxide raw material containing a transition metal element and a lithium element in a molar ratio of the lithium element to the transition metal element of 1 or more and 2 or less, in the presence of an inactive flux containing one or more compounds selected from the group consisting of a carbonate of M, a sulfate of M, a nitrate of M, a phosphate of M, a hydroxide of M, a molybdate of M, and a tungstate of M, wherein M represents one or more elements selected from the group consisting of Na, K, Rb, Cs, Ca, Mg, Sr and Ba.
<2> The method according to <1>, wherein the lithium mixed metal oxide raw material is a mixture of a compound of lithium and a compound of the transition metal element.
<3> The method according to <2>, wherein the compound of the transition metal element includes Fe.
<4> The method according to <3>, wherein the compound of the transition metal element further includes one or more elements selected from the group consisting of Ni, Mn and Co.
<5> The method according to any one of <1> to <4>, wherein the inactive flux is a carbonate of M, wherein M has same meaning as defined above.
<6> The method according to <5>, wherein the carbonate of M is $Na_2CO_3$ or $K_2CO_3$ or both.
<7> The method according to any one of <1> to <6>, wherein the inactive flux is present in an amount of 0.1 parts by weight or more and 100 parts by weight or less per 100 parts by weight of the lithium mixed metal oxide raw material at the commencement of calcination.
<8> The method according to any one of <1> to <7>, wherein a temperature of the calcination is in a range of from 200° C. to 1050° C.
<9> A layered structure lithium mixed metal oxide obtained by the method according to any one of <1> to <8>.
<10> A positive electrode active material including the layered structure lithium mixed metal oxide according to <9>.
<11> A positive electrode including the positive electrode active material according to <10>.
<12> A nonaqueous electrolyte secondary battery including the positive electrode according to <11>.
<13> The nonaqueous electrolyte secondary battery according to <12>, further including a separator.
<14> The nonaqueous electrolyte secondary battery according to <13>, wherein the separator is made of a laminated film which has a heat resistant porous layer and a porous film laminated to each other.

MODE FOR CARRYING OUT THE INVENTION

The method of producing a layered structure lithium mixed metal oxide of the present invention includes a step of calcining a lithium mixed metal oxide raw material containing a transition metal element and a lithium element in a molar ratio of the lithium element to the transition metal element of 1 or more and 2 or less, in the presence of an inactive flux including one or more compounds selected from the group consisting of a carbonate of M, a sulfate of M, a nitrate of M, a phosphate of M, a hydroxide of M, a molybdate of M, and a tungstate of M, wherein M represents one or more elements selected from the group consisting of Na, K, Rb, Cs, Ca, Mg, Sr and Ba.

When the molar ratio of the lithium element to the transition metal element is less than 1, the lithium mixed metal oxide easily has a rock salt type structure or a spinel type structure, and the output property of the obtained nonaqueous electrolyte secondary battery at a high current rate (hereinafter, referred to as a "rate property" in some cases) is not satisfactory. On the other hand, when the above-mentioned molar ratio is more than 2, the lithium mixed metal oxide includes much excess lithium, which causes the generation of impurities, such as lithium carbonate, and therefore the rate property of the obtained nonaqueous electrolyte secondary battery is not satisfactory, and it is difficult to obtain high discharge capacity. In the present invention, from the viewpoint of enhancing the rate property of the obtained battery, the molar ratio of the transition metal element to the lithium element is preferably 1.05 or more and 1.5 or less.

In the present invention, the lithium mixed metal oxide raw material is not particularly limited as long as it is formed into a layered structure lithium mixed metal oxide by calcination, but it is preferably a mixture of a compound of lithium and a compound of a transition metal element. Examples of the compound of a transition metal element include an oxide, hydroxide (wherein, the hydroxide also includes an oxyhydroxide. The same shall apply hereinafter), chloride, carbonate, sulfate, nitrate, oxalate, and acetate, of a transition metal element. These may be used in combination of two or more of them. As the compound of lithium, lithium hydroxide, lithium hydroxide monohydrate, or lithium carbonate is preferably used, and these may be used in combination of two or more of them. As the compound of a transition metal element, a hydroxide of a transition metal element is preferably used. Furthermore, the compound of a transition metal element preferably contains two or more of transition metal elements. In this case, the compound of a transition metal element may be one using two or more of compounds each containing only one transition metal element, but a compound containing two or more transition metal elements is further preferred. The compound containing two or more transition metal elements can be obtained by coprecipitation, and the compound is preferably a hydroxide.

In the present invention, it is preferable that the compound of a transition metal element contain Fe. The preferable amount of Fe is in the molar ratio of the amount of Fe to the total amount of the transition metal element is in the range of 0.01 or more and 0.5 or less, and more preferably in the range of 0.02 or more and 0.2 or less. Furthermore, from the viewpoint of enhancing the rate property of the obtained nonaqueous electrolyte secondary battery, it is preferable that the compound of a transition metal element contain Fe and further contain one or more of elements selected from the group consisting of Ni, Mn and Co, and it is more preferable that the compound contain Fe and further contain Ni and/or Mn. In the present invention, even if a Co raw material that has conventionally been used in positive electrode active material is not used, it is possible to obtain a layered structure lithium mixed metal oxide, which gives a nonaqueous electrolyte secondary battery having a high rate property.

In the present invention, the inactive flux does not easily react with the lithium mixed metal oxide raw material in calcination, and it is possible to use an inactive flux including one or more compounds selected from the group consisting of a carbonate of M, a sulfate of M, a nitrate of M, a phosphate of M, a hydroxide of M, a molybdate of M and a tungstate of M (wherein, M represents one or more elements selected from the group consisting of Na, K, Rb, Cs, Ca, Mg, Sr and Ba).

Examples of the carbonate of M may include $Na_2CO_3$, $K_2CO_3$, $Rb_2CO_3$, $Cs_2CO_3$, $CaCO_3$, $MgCO_3$, $SrCO_3$, $BaCO_3$, and the melting points are $Na_2CO_3$ (854° C.), $K_2CO_3$ (899° C.), $Rb_2CO_3$ (837° C.), $Cs_2CO_3$ (793° C.), $CaCO_3$ (825° C.) $MgCO_3$ (990° C.), $SrCO_3$ (1497° C.), and $BaCO_3$ (1380° C.).

Furthermore, examples of the sulfate of M may include $Na_2SO_4$, $K_2SO_4$, $Rb_2SO_4$, $Cs_2SO_4$, $CaSO_4$, $MgSO_4$, $SrSO_4$, and $BaSO_4$, and the melting points are $Na_2SO_4$ (884° C.), $K_2SO_4$ (1069° C.), $Rb_2SO_4$ (1066° C.), $Cs_2SO_4$ (1005° C.), $CaSO_4$ (1460° C.), $MgSO_4$ (1137° C.), $SrSO_4$ (1605° C.), and $BaSO_4$ (1580° C.).

Examples of the nitrate of M may include $NaNO_3$, $KNTO_3$, $RbNO_3$, $CsNO_3$, $Ca(NO_3)_2$, $Mg(NO_3)_2$, $Sr(NO_3)_2$, and $Ba(NO_3)_2$, and the melting points are $NaNO_3$ (310° C.), $KNO_3$ (337° C.), $RbNO_3$ (316° C.), $CsNO_3$ (417° C.), $Ca(NO_3)_2$ (561° C.), $Sr(NO_3)_2$ (645° C.), and $Ba(NO_3)_2$ (596° C.).

Examples of the phosphate of M may include $Na_3PO_4$, $K_3PO_4$, $Rb_3PO_4$, $Cs_3PO_4$, $Ca_3(PO_4)_2$, $Mg_3(PO_4)_2$, and $Ba_3(PO_4)_2$, and the melting points are $K_3PO_4$ (1340° C.), $Mg_3(PO_4)_2$ (1184° C.), $Sr_3(PO_4)_2$ (1727° C.), and $Ba_3(PO_4)_2$ (1767° C.).

Examples of the hydroxide of M may include NaOH, KOH, RbOH, CsOH, $Ca(OH)_2$, $Mg(OH)_2$, $Sr(OH)_2$, and $Ba(OH)_2$, and the melting points are NaOH (318° C.), KOH (360° C.), RbOH (301° C.), CsOH (272° C.), $Ca(OH)_2$ (408° C.), $Mg(OH)_2$ (350° C.), $Sr(OH)_2$ (375° C.), and $Ba(OH)_2$ (853° C.).

Examples of the molybdate of M may include $Na_2MoO_4$, $K_2MoO_4$, $Rb_2MoO_4$, $Cs_2MoO_4$, $CaMoO_4$, $MgMoO_4$, $SrMoO_4$, and $BaMoO_4$, and the melting points are $Na_2MoO_4$ (698° C.), $K_2MoO_4$ (919° C.), $Rb_2MoO_4$ (958° C.), $Cs_2MoO_4$ (956° C.), $CaMoO_4$ (1520° C.), $MgMoO_4$ (1060° C.), $SrMoO_4$ (1040° C.), and $BaMoO_4$ (1460° C.).

Examples of the tungstate of M include $Na_2WO_4$, $K_2WO_4$, $Rb_2WO_4$, $Cs_2WO_4$, $CaWO_4$, $MgWO_4$, $SrWO_4$, and $BaWO_4$, and the melting point is $Na_2WO_4$ (687° C.).

Furthermore, two or more of these inactive fluxes may be used. When two or more of these inactive fluxes are used, the melting point may be lowered. Furthermore, among these inactive fluxes, as an inactive flux for obtaining a particulate layered structure lithium mixed metal oxide having a higher crystalline property and having less aggregation between primary particles, a carbonate of M is preferable, and particularly, $Na_2CO_3$ or $K_2CO_3$ or both is preferable. Use of these inactive fluxes makes it possible to obtain a layered structure lithium mixed metal oxide that gives a nonaqueous electrolyte secondary battery having a higher rate property. Furthermore, if necessary, inactive fluxes other than the above-mentioned inactive fluxes may be used together. Examples of such fluxes include chlorides, such as KCl and $NH_4Cl$, and fluorides, such as KF and $NH_4F$.

In the present invention, it is preferable that the inactive flux be present in an amount of 0.1 parts by weight or more and 100 parts by weight or less per 100 parts by weight of the lithium mixed metal oxide raw material at the commencement of the calcination. More preferably, the inactive flux is present in an amount in the range of 0.5 parts by weight or more and 90 parts by weight or less, and further preferably in an amount in the range of 1 part by weight or more and 80 parts by weight or less.

The calcination temperature is an important factor from the viewpoint of adjusting the BET specific surface area of the obtained layered structure lithium mixed metal oxide. Usually, the higher the calcination temperature is, the smaller the BET specific surface area tends to be. The lower the calcination temperature is, the larger the BET specific surface area tends to be. The calcination temperature is preferably in the range of 200° C. or more and 1050° C. or less, and more preferably in the range of 650° C. or more and 1050° C. or less. The setting of the calcination temperature is depending upon the kinds of inactive fluxes to be used. For example, the above-mentioned melting point of the inactive flux may be taken into consideration, and the calcination temperature is preferably set in the range of from a temperature of the melting point minus 100° C. or more and a temperature of the melting point plus 100° C. or less. The calcination is usually carried out by allowing the calcination temperature to be maintained at the above-mentioned calcination temperature. The time during which the temperature is maintained at the calcination temperature is usually 0.1 to 20 hours, and preferably 0.5 to 8 hours. The temperature rising rate to the calcination temperature is usually 50 to 400° C./hour, and the temperature falling rate from the calcination temperature to room temperature is usually 10 to 400° C./hour. Furthermore, calcination atmospheres include air, oxygen, nitrogen, argon, or a mixed gas thereof, and air is preferable. Furthermore, the inactive flux may remain in the layered structure lithium mixed metal oxide, or may be removed by washing, evaporation, and the like.

Furthermore, after calcination, the obtained layered structure lithium mixed metal oxide may be pulverized using a ball mill, a jet mill or the like. The pulverization may permit adjusting the BET specific surface area of the layered structure lithium mixed metal oxide. Furthermore, pulverization and calcination may be conducted twice or more times repeatedly. Furthermore, the layered structure lithium mixed metal oxide may be washed or classified if necessary.

The layered structure lithium mixed metal oxide obtained by the above-mentioned method of the present invention is useful as a positive electrode active material of a nonaqueous electrolyte secondary battery capable of exhibiting high output in a high current rate.

It is preferable that the layered structure lithium mixed metal oxide obtained by the method of the present invention include a mixture of primary particles having a particle diameter (average value) of 0.05 µm or more 1 µm or less, and secondary particles formed by the aggregation of the primary particles and having a particle diameter (average value) of 2 µm or more and 100 µm or less. The particle diameters (average values) of the primary particles and the secondary particles can be measured by observation with SEM. Specifically, the average value can be obtained by calculating the average value of the values obtained by measuring the maximum diameters of particles from 50 of primary particles or secondary particles, which are photographed by SEM and arbitrarily selected. From the viewpoint of enhancing the effect of the present invention, the particle diameter (average value) of the secondary particles is preferably 2 or more and 50 or less, and further preferably 2 or more and 10 or less. Furthermore, the particle diameter (average value) of the primary particles is preferably 0.1 µm or more and 0.5 or less, and further preferably 0.1 or more and 0.3 µm or less.

The crystal structure of the layered structure lithium mixed metal oxide obtained by the method of the present invention has a layered structure. From the viewpoint of the discharge capacity of the obtained nonaqueous electrolyte secondary battery, the crystal structure of the layered structure lithium mixed metal oxide is preferably a crystal structure belonging to space group R-3m or C2/m. The space group R-3m is included in a hexagonal type crystal structure, and the hexagonal type crystal structure belongs to any one of space groups selected from among P3, $P3_1$, $P3_2$, R3, P-3, R-3, P312, P321, $P3_1$12, $P3_1$21, $P3_2$12, $P3_2$21, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_1$22, $P6_5$22, $P6_2$22, $P6_4$22, $P6_3$22, P6mm, P6cc, $P6_3$cm, $P6_3$mc, P-6m2, P-6c2, P-62m, P-62c, P6/mmm, P6/mcc, $P6_3$/mcm, and $P6_3$/mmc. Furthermore, the space group C2/m is included in a monoclinic type crystal structure, and the monoclinic type crystal structure belongs to any one of space groups selected from among P2, $P2_1$, C2, Pm, Pc, Cm, Cc, P2/m, $P2_1$/m, C2/m, P2/c, $P2_1$/c, and C2/c. The crystal structure of the layered structure lithium mixed metal oxide can be identified from a powder X-ray diffraction pattern obtained from powder X-ray diffractometry using CuKα as a radiation source.

Furthermore, in the present invention, when the transition metal element of the layered structure lithium mixed metal oxide is one or more transition metal elements selected from the group consisting of Ni, Mn, Co and Fe, part of the transition metal element may be substituted with other elements in the range where the effect of the present invention is not remarkably impaired. Herein, examples of the other elements may include B, Al, Ga, In, Si, Ge, Sn, Mg, Sc, Y, Zr, Hf, Nb, Ta, Cr, Mo, W, Tc, Ru, Rh, Ir, Pd, Cu, Ag, and Zn.

Furthermore, in the range where the effect of the present invention is not remarkably impaired, a compound different from the oxide may be attached onto the surface of the particles constituting the layered structure lithium mixed metal oxide of the present invention. Examples of the compound include a compound containing one or more elements selected from the group consisting of B, Al, Ga, In, Si, Ge, Sn, Mg and transition metal elements, preferably a compound containing one or more elements selected from the group consisting of B, Al, Mg, Ga, In and Sn, and more preferably a compound of Al. Furthermore, specific examples of the compound include oxides, hydroxides, oxyhydroxides, carbonates, nitrates, and organic acid salts of the above-mentioned elements, and the compound is preferably oxides, hydroxides, or oxyhydroxides. Furthermore, a mixture of these compounds may be used. Among these compounds, a particularly preferable compound is alumina. Furthermore, after such compounds are attached, they may be heated.

A positive electrode active material having the layered structure lithium mixed metal oxide obtained by the method of the present invention is suitable for a nonaqueous electrolyte secondary battery. Furthermore, in the present invention, the positive electrode active material may include only the layered structure lithium mixed metal oxide of the present invention, and a different compound may be attached to the surface of the particles as mentioned above.

As a method of producing a positive electrode having the positive electrode active material, the case of producing a positive electrode for a nonaqueous electrolyte secondary battery is described as an example hereinafter.

A positive electrode is produced by supporting a positive electrode mixture containing a positive electrode active material, a conductive material and a binder on a positive electrode current collector. As the conductive material, carbonaceous materials can be used. Examples of the carbonaceous materials include a graphite powder, carbon black, acetylene black, and filamentous carbonaceous materials. Since the carbon black and the acetylene black are particulates and have a large surface area, with the addition of small amount of such materials into the positive electrode mixture, the conductivity inside the positive electrode is enhanced, and the charge-discharge efficiency and the rate property can be improved. However, when added in a too large amount, an adhesion property by the binder between the positive electrode mixture and the positive electrode current collector is lowered, leading to a cause for increase in internal resistance. In general, the proportion of the conductive material in the positive electrode mixture is 5 parts by weight or more and 20 parts by weight or less per 100 parts by weight of the positive electrode active material. In the case of use of a filamentous carbonaceous material, such as graphitized carbon fiber or carbon nanotube as the conductive material, it is also possible to decrease this proportion.

As the above-described binder, a thermoplastic resin can be used. Specific examples thereof include fluorine resins, such as polyvinylidene fluoride (hereinafter, referred to as PVdF in some cases), polytetrafluoroethylene (hereinafter, referred to as PTEL in some cases), tetrafluoroethylene-propylene hexafluoride-vinylidene fluoride copolymers, propylene hexafluoride-vinylidene fluoride copolymers, and tetrafluoroethylene-perfluoro vinyl ether copolymers; and polyolefin resins, such as polyethylene and polypropylene. Furthermore, two or more of these compounds may be used in admixture. For example, a positive electrode mixture superior in adhesion property with an electrode current collector can be obtained by using a fluorine resin and a polyolefin resin as the binder, and containing the fluorine resin and the polyolefin resin so that the proportion of the fluorine resin relative to the positive electrode mixture is from 1 to 10% by weight and the proportion of the polyolefin resin relative to the positive electrode mixture is from 0.1 to 2% by weight.

For the positive electrode current collector, Al, Ni, stainless steel, and the like, can be used. Al is preferable because it can be processed into a thin film easily and it is cheap. Examples of a method of allowing the positive electrode mixture to be supported on the positive electrode current collector include a method of pressure molding; or a method of pasting the positive electrode mixture using an organic solvent and the like, applying the obtained paste on the positive electrode current collector, drying thereof, and then carrying out pressing and the like to attain fixation thereof. In the case of pasting, a slurry including the positive electrode active material, the conductive material, the binder and the organic solvent is produced. Examples of the organic solvent include amine solvents, such as N,N-dimethylaminopropylamine and diethylenetriamine; ether solvents, such as tetrahydrofuran; ketone solvents, such as methyl ethyl ketone; ester solvents, such as methyl acetate; amide solvents, such as dimethylacetamide and N-methyl-2-pyrrolidone.

Examples of a method of applying a paste of the positive electrode mixture onto the positive electrode current collector include a slit die coating method, a screen coating method, a curtain coating method, a knife coating method, a gravure coating method, and an electrostatic spray method. By the above-mentioned methods, a positive electrode for a nonaqueous electrolyte secondary battery can be produced.

As a method of producing a nonaqueous electrolyte secondary battery by using the above-mentioned positive electrode, the case of producing a lithium secondary battery is described as an example hereinafter. That is, an electrode group obtained by laminating or laminating and winding a separator, a negative electrode, a separator and the above-mentioned positive electrode in this order is accommodated in a battery case, and the electrode group is impregnated with an electrolytic solution, and thus a nonaqueous electrolyte secondary battery can be produced.

Examples of the shape of the above-mentioned electrode group include a shape having a cross-section when the electrode group is cut in a direction perpendicular to the winding of the electrode group is circle, ellipse, rectangle, and rounded rectangle. Furthermore, examples of the shape of the battery may include a paper shape, a coin shape, a cylindrical shape, and a rectangular shape.

The above-mentioned negative electrode is not particularly limited as long as it is capable of being doped and dedoped with a lithium ion at an electric potential that is lower than that of the positive electrode, and examples thereof may include an electrode formed by allowing a negative electrode mixture containing a negative electrode material to be supported by a negative electrode current collector, or an electrode consisting of a single negative electrode material. Examples of the negative electrode material may include a carbonaceous material, a chalcogen compound (an oxide, a sulfide, and the like), a nitride, metal or an alloy, which are materials capable of being doped and dedoped with a lithium ion at an electric potential that is lower than that of the positive electrode. Furthermore, such negative electrode materials may be mixed and used.

The above-mentioned negative electrode material is exemplified hereinafter. Specific examples of the above-mentioned carbonaceous material may include graphite, such as natural graphite and artificial graphite, cokes, carbon black, pyrolytic carbons, carbon fiber, and a calcined product of an organic polymer compound. Specific examples of the oxide may include oxides of silicon represented by the formula $SiO_x$ (wherein x denotes a positive real number), such as $SiO_2$ and $SiO$; oxides of titanium represented by the formula $TiO_x$ (wherein x denotes a positive real number), such as $TiO_2$ and $TiO$; oxides of vanadium represented by the formula $VO_x$ (wherein x denotes a positive real number), such as $V_2O_5$ and $VO_2$; oxides of iron represented by the formula $FeO_x$ (wherein x denotes a positive real number), such as $Fe_3O_4$, $Fe_2O_3$, and $FeO$; oxides of tin represented by the formula $SnO_x$ (wherein x denotes a positive real number), such as $SnO_2$ and $SnO$; oxides of tungsten represented by the formula $WO_x$ (wherein x denotes a positive real number), such as $WO_3$ and $WO_2$; mixed metal oxides containing lithium and titanium and/or vanadium, such as $Li_4Ti_5O_{12}$, $LiVO_2$, and $Li_{1.1}V_{0.9}O_2$. Specific examples of the sulfide may include sulfides of titanium represented by the formula $TiS_x$ (wherein x denotes a positive real number), such as $Ti_2S_3$, $TiS_2$, and $TiS$; sulfides of vanadium represented by the formula $VB_x$ (wherein x denotes a positive real number), such as $V_3S_4$, $VS_2$, and $VS$; sulfides of iron represented by the formula $FeS_x$ (wherein x denotes a positive real number), such as $Fe_3S_4$, $FeS_2$, and $FeS$; sulfides of molybdenum represented by the formula $MoS_x$ (wherein x denotes a positive real number), such as $Mo_2S_3$ and $MoS_2$; sulfides of tin represented by the formula $SnS_x$ (wherein x denotes a positive real number), such as $SnS_2$ and $SnS$; sulfides of tungsten represented by the formula $WS_x$ (wherein x denotes a positive real number), such as $WS_2$; sulfides of antimony represented by the formula $SbS_x$ (wherein x denotes a positive real number), such as $Sb_2S_3$; and sulfides of selenium represented by the formula $SeS$ (wherein x denotes a positive real number), such as $Se_5S_3$, $SeS_2$, and $SeS$. Specific examples of the nitride may include lithium-containing nitrides, such as $Li_3N$, and $Li_{3-x}A_xN$ (wherein, A denotes Ni and/or Co, x satisfies $0<x<3$). These carbonaceous materials, oxides, sulfides, and nitrides may be used together, and may be crystalline or amorphous. Furthermore, these carbonaceous materials, oxides, sulfides, and nitrides are supported on mainly a negative electrode current collector and used as an electrode.

Furthermore, specific examples of the metal may include lithium metals, silicon metals, and tin metals. Examples of the alloy may include lithium alloys, such as Li—Al, Li—Ni, and Li—Si; silicon alloys, such as Si—Zn; tin alloys, such as Sn—Mn, Sn—Co, Sn—Ni, Sn—Cu, and Sn—La; and alloys, such as $Cu_2Sb$ and $La_3Ni_2Sn_7$. These metals and alloys are, in most cases, used singly as an electrode (for example, used in the form of foil).

Among the negative electrode materials, carbonaceous materials made of graphite, such as natural graphite and artificial graphite, for a main component are preferably used from the viewpoint of high potential flatness, low average discharge potential, good cyclic performance, and the like. As the shape of the carbonaceous material, for example, any of flake such as natural graphite, sphere such as mesocarbon microbeads, fiber such as graphitized carbon fiber, and aggregate of fine powder, may be used.

The negative electrode mixture may contain a binder if necessary. Examples of the binder may include thermoplastic resins, and specific examples thereof may include PVdF, thermoplastic polyimide, carboxymethylcellulose, polyethylene, and polypropylene.

Examples of the negative electrode current collector may include Cu, Ni, and stainless steel, and from the viewpoint of difficulty of making an alloy with lithium and easiness of processing into a thin film, Cu may be used. A method for allowing a negative electrode mixture to be supported on the negative electrode current collector is the same as in the case of the positive electrode, and includes a method of pressure molding, a method of pasting the negative electrode mixture using a solvent and the like, and applying this on the negative electrode current collector and drying thereof, and then performing pressing to attain press bonding thereof, and the like.

As the separator, materials having the form of a porous film, a nonwoven fabric, a woven fabric or the like, may be used. Examples of the material of the separator may include polyolefin resins, such as polyethylene and polypropylene, fluorine resins, and nitrogen-containing aromatic polymers. Two or more of such materials may be formed into a separator, and the separator materials may be laminated. Examples of the separator may include separators described in JP-A-2000-30686, JP-A-10-324758 and the like. It is advantageous that the thickness of the separator is thinner as long as the mechanical strength is maintained, from the viewpoint of increase in the volume energy density of a battery and decrease in internal resistance thereof, and it is usually around from 5 to 200 μm, and preferably around from 5 to 40 μm.

The separator preferably includes a porous film containing a thermoplastic resin. A nonaqueous electrolyte secondary battery usually has a function by which, when an abnormal current flows in the battery because of short circuit between a positive electrode and a negative electrode and the like, the current is interrupted to block (shutdown) the flow of excessive current. Herein, the shutdown is carried out by obstructing micropores of the porous film in the separator when the temperature exceeds the usual temperature for use. Then, after the shutdown, it is preferable that even if the temperature in the battery is increased to some extent, film destruction due to the temperature should not occur, and the shutdown state is maintained. Examples of such a separator include a laminated film which has a heat resistant porous layer and a porous film laminated to each other. When such a film is used as a separator, the heat resistant property of a secondary battery in the present invention can be enhanced. In the laminated film, the heat resistant porous layer may be laminated onto both surfaces of the porous film.

Hereinafter, the laminated film obtained by laminating the heat resistant porous layer and the porous film is described.

In the laminated film, the heat resistant porous layer is a layer having higher heat resistant property than the porous film. The heat resistant porous layer may be formed from an inorganic powder, and may contain a heat resistant resin. Because the heat resistant porous layer contains a heat resistant resin, the heat resistant porous layer can be formed by an easy technique, such as coating. Examples of the heat resistant resin may include polyamide, polyimide, polyamide-imide, polycarbonate, polyacetal, polysulfone, polyphenylene sulfide, polyether ketone, aromatic polyester, polyether sulfone, and polyether imide. From the viewpoint of enhancing the heat resistant property, polyamide, polyimide, polyamide-imide, polyether sulfone, and polyether imide are preferable, and polyamide, polyimide, and polyamide-imide are more preferable. Nitrogen-containing aromatic polymers, such as aromatic polyamide (para-oriented aromatic polyamide, meta-oriented aromatic polyamide), aromatic polyimide, and aromatic polyamide-imide are furthermore preferable. Aromatic polyamide is particularly preferable. In production aspect, para-oriented aromatic polyamide (hereinafter, referred to as "para-aramide" in some cases) is more particularly preferable. Furthermore, examples of the heat resistant resin may include poly-4-methyl pentene-1 and cyclic olefin polymer. Use of such heat resistant resins makes it possible to enhance the heat resistant property of a laminated film, that is, the thermal film breaking temperature of a laminated film. When the nitrogen-containing aromatic polymer is used among such heat resistant resins, compatibility with an electrolytic solution, that is, a liquid retaining property in the heat resistant porous layer may also be improved, possibly due to polarity in its molecule, and also the rate of impregnation of an electrolytic solution in the production of a nonaqueous electrolyte secondary battery is high, and also the charge and discharge capacity of a nonaqueous electrolyte secondary battery is further enhanced.

The thermal film breaking temperature of such a laminated film is dependent upon the kind of the heat resistant resin, and is selected and used according to places for use and purposes for use. More specifically, the thermal film breaking temperature can be controlled to around 400° C. when the above-mentioned nitrogen-containing aromatic polymer is used as the heat resistant resin, to around 250° C. when poly-4-methyl pentene-1 is used, and to around 300° C. when cyclic olefin polymer is used, respectively. Furthermore, the thermal film breaking temperature can also be controlled to, for example, around 500° C. or more when the heat resistant porous layer is formed from an inorganic powder.

The above-mentioned para-aramide is obtained by condensation polymerization of para-oriented aromatic diamine and para-oriented aromatic dicarboxylic acid halide, and consists substantially of a repeating unit in which an amide bond is linked at a para-position or orientation position according to the para-position of an aromatic ring (for example, orientation position extending coaxially or parallel toward the reverse direction, such as 4,4'-biphenylene, 1,5-naphthalene, and 2,6-naphthalene). Specific examples thereof include para-aramides having a para-orientation type structure or a structure according to the para-orientation type, such as poly(para-phenylene terephthalamide), poly(para-benzamide), poly(4,4'-benzanilide terephthalamide), poly(para-phenylene-4,4'-biphenylene dicarboxylic acid amide), poly(para-phenylene-2,6-naphthalene dicarboxylic acid amide), poly(2-chloro-para-phenylene terephthalamide), and para-phenylene terephthalamide/2,6-dichloro para-phenylene terephthalamide copolymer.

The aromatic polyimide is preferably a wholly aromatic polyimide produced by condensation polymerization of aromatic dianhydride and diamine. Specific examples of the dianhydride may include pyromellitic acid dianhydride, 3,3', 4,4'-diphenylsulfone tetracarboxylic acid dianhydride, 3,3',4, 4'-benzophenone tetracarboxylic acid dianhydride, 2,2'-bis (3,4-dicarboxyphenyl)hexafluoropropane, and 3,3',4,4'-biphenyltetracarboxylic acid dianhydride. Specific examples of the diamine may include oxydianiline, para-phenylenediamine, benzophenone diamine, 3,3'-methylenedianiline, 3,3'-diaminobenzophenone, 3,3'-diaminodiphenyl sulfone, and 1,5'-naphthalene diamine. Furthermore, polyimide soluble in a solvent can be suitably used. Examples of such a polyimide may include a polyimide of a polycondensate of 3,3',4,4'-diphenylsulfone tetracarboxylic acid dianhydride and an aromatic diamine.

Examples of the aromatic polyamide-imide may include a product obtained by condensation polymerization using aromatic dicarboxylic acid and aromatic diisocyanate, and a product obtained by condensation polymerization using aromatic dianhydride and aromatic diisocyanate. Specific examples of the aromatic dicarboxylic acid may include isophthalic acid, and terephthalic acid. Specific examples of the aromatic dianhydride may include trimellitic anhydride. Specific examples of the aromatic diisocyanate may include 4,4'-diphenylmethane diisocyanate, 2,4-tolylene diisocyanate, 2,6-tolylene diisocyanate, ortho-tolylane diisocyanate, and m-xylene diisocyanate.

Furthermore, from the viewpoint of enhancing ion permeability, it is preferable that the thickness of the heat resistant porous layer be thin, and the thickness is preferably 1 μm or more and 10 μm or less, further preferably 1 μm or more and 5 μm or less, and particularly preferably 1 μm or more and 4 μm or less. Furthermore, the heat resistant porous layer has micropores, and the pore size (diameter) thereof is usually 3 μm or less, and preferably 1 μm or less. Furthermore, when the heat resistant porous layer contains the heat resistant resin, the heat resistant porous layer further can also contain the below-mentioned filler.

In the laminated film, it is preferable that the porous film have micropores and have a shutdown function. In this case, the porous film contains a thermoplastic resin. The size of the micropore in the porous film is usually 3 μm or less, and preferably 1 μm or less. The porosity of the porous film is usually 30 to 80 vol %, and preferably 40 to 70 vol %. In the nonaqueous electrolyte secondary battery, when the temperature exceeds the usual temperature for use, the porous film containing a thermoplastic resin can obstruct the micropores by the softening of the thermoplastic resin constituting the porous film.

As the thermoplastic resin, any thermoplastic resin can be selected as long as it is not dissolved in an electrolytic solution in the nonaqueous electrolyte secondary battery. Specific examples thereof may include polyolefin resins, such as polyethylene and polypropylene, and thermoplastic polyurethane resins, and two or more thereof may be used. From the viewpoint of being softened and shut down at lower temperatures, it is preferable that the resin contain polyethylene. Specific examples of the polyethylene may include polyethylenes, such as low-density polyethylene, high-density polyethylene, and linear polyethylene, and also include ultra high molecular weight polyethylene having a molecular weight of 1,000,000 or more. From the viewpoint of enhancing the puncture strength of the porous film, the thermoplastic resin constituting the film preferably contains at least ultra high molecular weight polyethylene. Furthermore, from the aspect of manufacturing a porous film, the thermoplastic resin may preferably contain wax made of polyolefin having a low molecular weight (weight-average molecular weight: 10,000 or less).

Furthermore, the thickness of the porous film in the laminated film is usually from 3 to 30 μm, and further preferably from 3 to 25 μm. Furthermore, in the present invention, the thickness of the laminated film is usually 40 μm or less and preferably 20 μm or less. It is preferable that the value of A/B be 0.1 or more and 1 or less, where the thickness of the heat resistant porous layer is A (μm) and the thickness of the porous film is B (μm).

Furthermore, when the heat resistant porous layer contains the heat resistant resin, the heat resistant porous layer may contain one or more fillers. The material of the filler may be selected from any of an organic powder, an inorganic powder or a mixture thereof. Particles constituting the filler preferably have an average particle diameter of 0.01 μm or more and 1 μm or less.

Examples of the organic powder may include powders made of organic substances, such as copolymers of single or two or more of styrene, vinyl ketone, acrylonitrile, methyl methacrylate, ethyl methacrylate, glycidyl methacrylate, glycidyl acrylate, and methyl acrylate; fluorine-based resins, such as polytetrafluoroethylene, ethylene tetrafluoride-propylene hexafluoride copolymer, ethylene tetrafluoride-ethylene copolymer and polyvinylidene fluoride; melamine resins; urea resins; polyolefins; and polymethacrylates. The organic powders may be used singly, or in admixture of two or more thereof. Among these organic powders, polytetrafluoroethylene powder is preferable from the viewpoint of chemical stability.

Examples of the inorganic powder may include powders made of inorganic substances, such as metal oxide, metal nitride, metal carbide, metal hydroxide, carbonate, and sulfate. Among these substances, powders made of inorganic substances having low conductivity are preferably used. Specific examples thereof include powders made of alumina, silica, titanium dioxide, or calcium carbonate. The inorganic powders may be used singly or in mixture of two or more thereof. Among these inorganic powders, from the viewpoint of chemical stability, alumina powder is preferable. Herein, it is preferable that all the particles constituting the filler be alumina particles. A more preferable embodiment is that all the particles constituting the filler are alumina particles, and part or all of them are substantially spherical alumina particles. When the heat resistant porous layer is formed from an inorganic powder, the above-exemplified inorganic powders may be used, and a binder may be mixed therewith and used if necessary.

The content of the filler when the heat resistant porous layer contains the heat resistant resin depends upon the specific gravity of the material of the filler. For example, the weight of the filler is usually 5 or more and 95 or less, preferably 20 or more 95 or less, and more preferably 30 or more and 90 or less, when the total weight of the heat resistant porous layer is made to be 100, in the case where all the particles constituting the filler are alumina particles. Such ranges can be appropriately set according to the specific gravity of the material of the filler.

The shape of the particles constituting the filler includes a substantially spherical shape, a plate shape, a columnar shape, a needle-like shape, a whisker shape, a fiber shape, and the like, and any of shapes may be used. From the viewpoint that uniform pores can be formed easily, the particles constituting the filler are preferably substantially spherical particles. The substantially spherical particles may include particles having an aspect ratio (particle major axis/particle minor axis) is in the range of 1 or more and 1.5 or less. The particle aspect ratio can be measured by an electron micrograph.

In the present invention, from the viewpoint of ion permeability, the separator has an air permeability according to the Gurley method of from preferably 50 to 300 second/100 cc, and further preferably from 50 to 200 second/100 cc. Furthermore, the porosity of the separator is usually 30 to 80 vol %, and preferably 40 to 70 vol %. The separator may be a laminate of separators having different porosities.

In a secondary battery, an electrolytic solution usually contains an electrolyte and an organic solvent. Examples of the electrolyte include lithium salts, such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$ $Li(C_4F_9SO_3)$ $LiC(SO_2CF_3)_3$, $Li_2B_{10}Cl_{10}$, LiBOB (herein, BOB denotes bis(oxalato)borate), lower aliphatic carboxylic acid lithium salts, and $LiAlCl_4$, and a mixture of two or more thereof may be used. Among them, as the lithium salt, a salt containing at least one selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$, which contain fluorine, is usually used.

Furthermore, examples of the organic solvent to be used in the electrolytic solution may include carbonates, such as propylene carbonate, ethylene carbonate, dimethyl carbonate, diethyl carbonate, ethyl methyl carbonate, 4-trifluoromethyl- 1,3-dioxolane-2-on, and 1,2-di(methoxycarbonyloxy) ethane; ethers, such as 1,2-dimethoxyethane, 1,3-dimethoxy propane, pentafluoropropyl methyl ether, 2,2,3,3-tetrafluoropropyl difluoromethyl ether, tetrahydrofuran, and 2-methyltetrahydrofuran; esters, such as methyl formate, methyl acetate, and γ-butyrolactone; nitriles, such as acetonitrile and butyronitrile; amides, such as N,N-dimethylformamide and N,N-dimethylacetamide; carbamates, such as 3-methyl-2-oxazolidone; sulfur-containing compounds, such as sulfolane, dimethyl sulfoxide, and 1,3-propanesultone, and substances in which a fluorine substituent is introduced into the above-mentioned organic solvent. Two or more thereof may be mixed and used. Among them, a mixed solvent containing carbonates is preferable, and a mixed solvent of cyclic carbonate and non-cyclic carbonate, or a mixed solvent of cyclic carbonate and ethers are further preferable. As the mixed solvent of cyclic carbonate and non-cyclic carbonate, a mixed solvent of ethylene carbonate, dimethyl carbonate and ethyl methyl carbonate is preferable from the viewpoint that the solvent has a wide operational temperature range, a superior load property, and a persistent property even if graphite materials, such as natural graphite and artificial graphite are used as the negative electrode active material. Furthermore, from the viewpoint that it is capable of obtaining a particularly superior effect of improving safety, an electrolytic solution including a lithium salt containing fluorine, such as $LiPF_6$, and an organic solvent having a fluorine substituent is preferably used. A mixed solvent containing ethers having a fluorine substituent, such as pentafluoropropyl methyl ether and 2,2,3,3-tetrafluoropropyl difluoromethyl ether and dimethyl carbonate is further preferable because of its discharge property with a large electric current.

Instead of the above-mentioned electrolytic solution, a solid electrolyte may be used. Examples of the solid electrolyte may include organic polymer electrolytes, such as a polyethylene oxide polymer compound, and a polymer compound having at least one or more of a polyorganosiloxane chain and a polyoxyalkylene chain. Furthermore, an electrolyte in which a nonaqueous electrolyte electrolytic solution is supported on a polymer compound, that is, a gel type electrolyte may also be used. Furthermore, an inorganic solid electrolyte including sulfides, such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, and $Li_2S$—$SiS_2$—$Li_2SO_4$ may be used. Use of such solid electrolytes may further enhance the safety. Furthermore, when the solid electrolyte is used in the nonaqueous electrolyte secondary battery of the present invention, the solid electrolyte may play a role as a separator. In such a case, a separator may not be needed.

EXAMPLE

Next, the present invention will be described in more detail with reference to examples. The evaluation of a layered structure lithium mixed metal oxide (positive electrode active material), a charge-discharge test, and a discharge rate test were carried out as follows.

1. Charge-Discharge Test

To a mixture of a positive electrode active material and a conductive material (a mixture of acetylene black and graphite in the weight ratio of 1:9), a solution of PVdF in N-methyl-2-pyrrolidone (hereinafter, referred to as "NMP" in some cases) as a binder was added so that the resultant mixture had a composition of positive electrode active material:conductive material:binder=86:10:4 (weight ratio), and the mixture was kneaded so as to obtain a paste. The paste was applied on an Al foil having the thickness of 40 μm as a current collector and dried in vacuum at 150° C. for 8 hours to obtain a positive electrode.

The obtained positive electrode, a solution as an electrolytic solution obtained by dissolving $LiPF_6$ in a mixed solution of ethylene carbonate (hereinafter, referred to as "EC" in some cases), dimethyl carbonate (hereinafter, referred to as "DMC" in some cases) and ethyl methyl carbonate (hereinafter, referred to as "EMC" in some cases) in the ratio of 30:35:35 (volume ratio) so that the concentration of $LiPF_6$ was 1 mol/liter (hereinafter, referred to as "$LiPF_6$/EC+DMC+EMC" in some cases), a polypropylene porous membrane as a separator, and metallic lithium as a negative electrode are assembled to produce a coin type battery (R2032).

A discharge rate test was carried out by using the above-mentioned coin type battery while maintaining the battery at 25° C. under the below-mentioned conditions. In the discharge rate test, discharge capacity was measured by varying a discharge current at the time of discharging, and the discharge capacity retention ratio was calculated as follows.

<Discharge Rate Test>

Charge maximum voltage: 4.3 V, Charge time: 8 hours, Charge current: 0.2 mA/cm$^2$ During discharging, the discharge minimum voltage was made to be a constant voltage of 3.0 V, and discharge was carried out by varying a discharge current in each cycle as follows. Higher discharge capacity by discharge at the following 10 C (high current rate) means high output.

Discharge in the first and second cycles (0.2 C): Discharge current 0.2 mA/cm$^2$ Discharge in the third cycle (1 C): Discharge current 1.0 mA/cm$^2$ Discharge in the fourth cycle (5 C): Discharge current 5.0 mA/cm$^2$ Discharge in the fifth cycle (10 C): Discharge current 10 mA/cm$^2$ <Discharge Capacity Retention Ratio>

Discharge capacity retention ratio (%)=Discharge capacity in predetermined cycle/Initial discharge capacity×100

2. Measurement of BET Specific Surface Area of Layered Structure Lithium Mixed Metal Oxide One gram of a powder was dried in a nitrogen atmosphere at 150° C. for 15 minutes, and then the BET specific surface area thereof was measured using FlowSorb 112300 manufactured by Micromeritics.

3. Composition Analysis of Layered Structure Lithium Mixed Metal Oxide

A powder was dissolved in hydrochloric acid, and then the composition was determined using an inductively coupled plasma atomic emission spectroscopy (SPS3000, hereinafter referred to as "ICP-AES" in some cases).

4. Powder X-ray Diffractometry of Layered Structure Lithium Mixed Metal Oxide

The powder X-ray diffractometry of a layered structure lithium mixed metal oxide was carried out using RINT 2500 TTR-type manufactured by Rigaku Corporation. The layered structure lithium mixed metal oxide was filled on a dedicated substrate, and then the measurement was carried out in the range of a diffraction angle 2θ of from 10° to 90° using a CuKα radiation source, to obtain a powder X-ray diffraction pattern.

Example 1

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.07 g of nickel(II) chloride hexahydrate, 11.38 g of manganese(II) chloride tetrahydrate, and 2.49 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.00 g of the coprecipitate, 1.16 g of lithium hydroxide monohydrate and 1.16 g of $K_2CO_3$ (the amount of the inactive flux was 36 parts by weight per 100 parts by weight of the lithium mixed metal oxide raw material) were dry mixed to obtain a mixture. Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, and the pulverized article was washed with distilled water by decantation and filtered to obtain a solid, and then the resultant solid was dried at 100° C. for 8 hours to obtain a powder B.

As a result of the composition analysis of the powder $B^1$, it was found that the molar ratio of Li:Ni:Mn:Fe was 1.12:0.44:0.46:0.10. Furthermore, the powder $B^1$ had a BET specific surface area of 7.9 m²/g, and the particle diameter of primary particles in SEM observation of the powder $B^1$ was 0.1 μm in average. As a result of the powder X-ray diffraction measurement, the crystal structure of the powder $B^1$ was a layered structure belonging to the R-3m space group.

2. Discharge Rate Test of Nonaqueous Electrolyte Secondary Battery

A coin type battery was produced by using the powder $B^1$ as a positive electrode active material, and a discharge rate test of the battery was carried out to find that the discharge capacities (mAh/g) at 0.2 C, 1 C, 5 C and 10 C were 119, 102, 79, and 63, respectively, and the discharge capacity retention ratios (%) thereof were 100, 86, 66 and 53, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 2

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.85 g of the coprecipitate, 1.51 g of lithium carbonate and 0.40 g of $K_2CO_3$ (the amount of the inactive flux was 9 parts by weight per 100 parts by weight of the lithium mixed metal oxide raw material) were dry mixed to obtain a mixture. Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, and the pulverized article was washed with distilled water by decantation and filtered to obtain a solid, and then the resultant solid was dried at 100° C. for 8 hours to obtain a powder $B^2$.

As a result of the composition analysis of the powder $B^2$, it was found that the molar ratio of Li:Ni:Mn:Fe was 1.15:0.47:0.48:0.05. Furthermore, the powder $B^2$ had a BET specific surface area of 8.2 m²/g, and the particle diameter of primary particles in SEM observation of the powder $B^2$ was 0.1 μm in average. As a result of the powder X-ray diffraction measurement, the crystal structure of the powder $B^2$ was a layered structure belonging to the R-3m space group.

2. Discharge Rate Test of Nonaqueous Electrolyte Secondary Battery

A coin type battery was produced by using the powder $B^2$ as a positive electrode active material, and a discharge rate test of the battery was carried out to find that the discharge capacities (mAh/g) at 0.2 C, 1 C, 5 C and 10 C were 140, 133, 116 and 104, respectively, and the discharge capacity retention ratios (%) thereof were 100, 95, 83, and 74, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 3

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.85 g of the coprecipitate, 1.51 g of lithium carbonate, 0.40 g of $K_2CO_3$, and 0.60 g of KCl (the amount of the inactive flux $K_2CO_3$ was 9 parts by weight and the amount of the inactive flux KCl was 14 parts by weight per 100 parts by weight of the lithium mixed metal oxide raw material) were dry mixed to obtain a mixture. Next, the mixture was placed in an alumina calcination container, calcined by maintaining it in an air atmosphere at 930° C. for 6 hours using an electric furnace and then cooled to room temperature to obtain a calcined article. The calcined article was pulverized to obtain a pulverized article, and the pulverized article was washed with distilled water by decantation and filtered to obtain a solid, and then the resultant solid was dried at 100° C. for 8 hours to obtain a powder $B^3$.

As a result of the composition analysis of the powder $B^3$, it was found that the molar ratio of Li:Ni:Mn:Fe was 1.21:0.47:0.48:0.05. Furthermore, the powder $B^3$ had a BET specific surface area of 2.4 $m^2/g$, and the particle diameter of primary particles in SEM observation of the powder $B^3$ was 0.3 μm in average. As a result of the powder X-ray diffraction measurement, the crystal structure of the powder $B^3$ was a layered crystal structure belonging to the R-3m space group.

2. Discharge Rate Test of Nonaqueous Electrolyte Secondary Battery

A coin type battery was produced by using the powder $B^3$ as a positive electrode active material, and a discharge rate test of the battery was carried out to find that the discharge capacities (mAh/g) at 0.2 C, 1 C, 5 C and 10 C were 130, 116, 92, and 79, respectively, and the discharge capacity retention ratios (%) thereof were 100, 89, 71, and 61, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 4

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 4.00 g of the coprecipitate, 2.14 g of lithium carbonate, 0.30 g of $K_2CO_3$, and 0.36 g of $K_2SO_4$ (the amount of the inactive flux $K_2CO_3$ was 5 parts by weight and the amount of the inactive flux $K_2SO_4$ was 6 parts by weight per 100 parts by weight of the lithium mixed metal oxide raw material) were dry mixed to obtain a mixture. Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, and the pulverized article was washed with distilled water by decantation and filtered to obtain a solid, and then the resultant solid was dried at 100° C. for 8 hours to obtain a powder $B^4$.

As a result of the composition analysis of the powder $B^4$, it was found that the molar ratio of Li:Ni:Mn:Fe was 1.11:0.47:0.48:0.05. Furthermore, the powder $B^4$ had a BET specific surface area of 8.5 $m^2/g$, and the particle diameter of primary particles in SEM observation of the powder $B^4$ was 0.1 μm in average. As a result of the powder X-ray diffraction measurement, the crystal structure of the powder $B^4$ was a layered structure belonging to the R-3m space group.

2. Discharge Rate Test of Nonaqueous Electrolyte Secondary Battery

A coin type battery was produced by using the powder $B^4$ as a positive electrode active material, and a discharge rate test of the battery was carried out to find that the discharge capacities (mAh/g) at 0.2 C, 1 C, 5 C and 10 C were 141, 132, 115, and 99, respectively, and the discharge capacity retention ratios (%) thereof were 100, 94, 82, and 70, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 5

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 4.00 g of the coprecipitate, 2.14 g of lithium carbonate, and 0.47 g of $Na_2CO_3$ (the amount of the inactive flux was 8 parts by weight per 100 parts by weight of the lithium mixed metal oxide raw material) were dry mixed to obtain a mixture. Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, and the pulverized article was washed with distilled water by decantation and filtered to obtain a solid, and then the resultant solid was dried at 100° C. for 8 hours to obtain a powder $B^5$.

As a result of the composition analysis of powder $B^5$, it was found that the molar ratio of Li:Ni:Mn:Fe was 1.14:0.47:0.48:0.05. Furthermore, the powder $B^5$ had a BET specific surface area of 9.2 m²/g, and the particle diameter of primary particles in SEM observation of the powder $B^5$ was 0.1 μm in average. As a result of the powder X-ray diffraction measurement, the crystal structure of the powder $B^5$ was a layered structure belonging to the R-3m space group.

2. Discharge Rate Test of Nonaqueous Electrolyte Secondary Battery

A coin type battery was produced by using the powder $B^5$ as a positive electrode active material, and a discharge rate test of the battery was carried out to find that the discharge capacities (mAh/g) at 0.2 C, 1 C, 5 C and 10 C were 145, 136, 120 and 96, respectively, and the discharge capacity retention ratios (%) thereof were 100, 94, 83, and 66, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 6

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 4.00 g of the coprecipitate, 2.14 g of lithium carbonate, 0.31 g of $K_2CO_3$, and 0.39 g of $K_3PO_4$ (the amount of the inactive flux $K_2CO_3$ was 5 parts by weight and the amount of the inactive flux $K_3PO_4$ was 6 parts by weight per 100 parts by weight of the lithium mixed metal oxide raw material) were dry mixed to obtain a mixture. Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, and the pulverized article was washed with distilled water by decantation and filtered to obtain a solid, and then the resultant solid was dried at 100° C. for 8 hours to obtain a powder $B^6$.

As a result of the composition analysis of powder $B^6$, it was found that the molar ratio of Li:Ni:Mn:Fe was 1.09:0.47:0.48:0.05. Furthermore, the powder $B^6$ had a BET specific surface area of 8.5 m²/g, and the particle diameter of primary particles in SEM observation of the powder $B^6$ was 0.1 μm in average. As a result of the powder X-ray diffraction measurement, the crystal structure of the powder $B^6$ was a layered structure belonging to the R-3m space group.

2. Discharge Rate Test of Nonaqueous Electrolyte Secondary Battery

A coin type battery was produced by using the powder $B^6$ as a positive electrode active material, and a discharge rate test of the battery was carried out to find that the discharge capacities (mAh/g) at 0.2 C, 1 C, 5 C and 10 C were 144, 135, 118, and 106, respectively, and the discharge capacity retention ratios (%) thereof were 100, 94, 82, and 74, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 7

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.87 g of the coprecipitate, 1.44 g of lithium carbonate, 0.32 g of $Na_2CO_3$, and 0.43 g of $Na_2SO_4$ (the amount of the inactive flux $Na_2CO_3$ was 7 parts by weight and the amount of the inactive flux $Na_2SO_4$ was 10 parts by weight per 100 parts by weight of the lithium mixed metal oxide raw material) were dry mixed to obtain a mixture. Next, the mixture was placed in an alumina calcination container, calcined by maintaining it in an air atmosphere at 950° C. for 6 hours using an electric furnace and then cooled to room temperature to obtain a calcined article. The calcined article was pulverized to obtain a pulverized article, and the pulverized article was washed with distilled water by decantation and filtered to obtain a solid, and then the resultant solid was dried at 100° C. for 8 hours to obtain a powder $B^7$.

As a result of the composition analysis of the powder $B^7$, it was found that the molar ratio of Li:Ni:Mn:Fe was 1.09:0.47:0.48:0.05. Furthermore, the powder $B^7$ had a BET specific surface area of 6.4 m²/g, and the particle diameter of primary particles in SEM observation of the powder $B^7$ was 0.1 μm in average. As a result of the powder X-ray diffraction measurement, the crystal structure of the powder $B^7$ was a layered structure belonging to the R-3m space group.

2. Discharge Rate Test of Nonaqueous Electrolyte Secondary Battery

A coin type battery was produced by using the powder $B^7$ as a positive electrode active material, and a discharge rate test of the battery was carried out to find that the discharge capacities (mAh/g) at 0.2 C, 1 C, 5 C and 10 C were 140, 125, 118, and 106, respectively, and the discharge capacity retention ratios (%) thereof were 100, 89, 84, and 76, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 8

$K_2MoO_4$ Flux

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.00 g of the coprecipitate, 1.05 g of lithium carbonate, and 0.27 g of $K_2MoO_4$ (the amount of the inactive flux was 9 parts by weight per 100 parts by weight of the lithium mixed metal oxide raw material) were dry mixed to obtain a mixture. Next, the mixture was placed in an alumina calcination container, calcined by maintaining it in an air atmosphere at 870° C. for 6 hours using an electric furnace and then cooled to room temperature to obtain a calcined article. The calcined article was pulverized to obtain a pulverized article, the pulverized article was washed with distilled water by decantation and filtered to obtain a solid, and then the resultant solid was dried at 100° C. for 8 hours to obtain a powder $B^8$.

As a result of the composition analysis of the powder $B^8$, it was found that the molar ratio of Li:Ni:Mn:Fe was 1.19:0.46:0.49:0.05. Furthermore, the powder $B^8$ had a BET specific surface area of 4.5 $m^2/g$, and the particle diameter of primary particles in SEM observation of the powder $B^8$ was 0.1 μm in average. As a result of the powder X-ray diffraction measurement, the crystal structure of the powder $B^8$ was a layered structure belonging to the R-3m space group.

2. Discharge Rate Test of Nonaqueous Electrolyte Secondary Battery

A coin type battery was produced by using the powder $B^8$ as a positive electrode active material, and a discharge rate test of the battery was carried out to find that the discharge capacities (mAh/g) at 0.2 C, 1 C, 5 C and 10 C were 148, 135, 117, and 103, respectively, and the discharge capacity retention ratios (%) thereof were 100, 92, 80, and 70, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 9

$Na_2MoO_4$ Flux

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.00 g of the coprecipitate, 1.05 g of lithium carbonate, and 0.27 g of $Na_2MoO_4$ (the amount of the inactive flux was 9 parts by weight per 100 parts by weight of the lithium mixed metal oxide raw material) were dry mixed to obtain a mixture. Next, the mixture was placed in an alumina calcination container, calcined by maintaining it in an air atmosphere at 870° C. for 6 hours using an electric furnace and then cooled to room temperature to obtain a calcined article. The calcined article was pulverized to obtain a pulverized article, the pulverized article was washed with distilled water by decantation and filtered to obtain a solid, and then the resultant solid was dried at 100° C. for 8 hours to obtain a powder $B^9$.

As a result of the composition analysis of the powder $B^9$, it was found that the molar ratio of Li:Ni:Mn:Fe was 1.11:0.46:0.49:0.05. Furthermore, the powder $B^9$ had a BET specific surface area of 5.4 $m^2/g$, and the particle diameter of primary particles in SEM observation of the powder $B^9$ was 0.1 μm in average. As a result of the powder X-ray diffraction measurement, the crystal structure of the powder $B^9$ was a layered structure belonging to the R-3m space group.

2. Discharge Rate Test of Nonaqueous Electrolyte Secondary Battery

A coin type battery was produced by using the powder $B^9$ as a positive electrode active material, and a discharge rate test of the battery was carried out to find that the discharge capacities (mAh/g) at 0.2 C, 1 C, 5 C and 10 C were 145, 134, 116, and 101, respectively, and the discharge capacity retention ratios (%) thereof were 100, 92, 80, and 70, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 10

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.87 g of the coprecipitate, 1.53 g of lithium carbonate, 0.17 g of $Na_2CO_3$, and 0.46 g of $Na_2WO_4$ (the amount of the inactive flux $Na_2CO_3$ was 4 parts by weight and the amount of the inactive flux $Na_2WO_4$ was 10 parts by weight per 100 parts by weight of the lithium mixed metal oxide raw material) were dry mixed to obtain a mixture. Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, the pulverized article was washed with distilled water by decantation and filtered to obtain a solid, and then the resultant solid was dried at 100° C. for 8 hours to obtain a powder $B^{10}$.

As a result of the composition analysis of the powder $B^{10}$, it was found that the molar ratio of Li:Ni:Mn:Fe was 1.21:0.47:0.48:0.05. Furthermore, the powder $B^{10}$ had a BET specific surface area of 8.0 $m^2/g$, and the particle diameter of primary particles in SEM observation of the powder $B^{10}$ was 0.2 μm in average. As a result of the powder X-ray diffraction measurement, the crystal structure of the powder $B^{10}$ was a layered structure belonging to the R-3m space group.

2. Discharge Rate Test of Nonaqueous Electrolyte Secondary Battery

A coin type battery was produced by using the powder $B^{10}$ as a positive electrode active material, and a discharge rate test of the battery was carried out to find that the discharge capacities (mAh/g) at 0.2 C, 1 C, 5 C and 10 C were 144, 136, 121, and 108, respectively, and the discharge capacity retention ratios (%) thereof were 100, 94, 84, and 75, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 11

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.87 g of the coprecipitate, 1.53 g of lithium carbonate, 0.22 g of $Na_2CO_3$, and 0.52 g of $K_2WO_4$ (the amount of the inactive flux $Na_2CO_3$ was 5 parts by weight and the amount of the inactive flux $K_2WO_4$ was 12 parts by weight per 100 parts by weight of the lithium mixed metal oxide raw material) were dry mixed to obtain a mixture. Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, the pulverized article was washed with distilled water by decantation and filtered, and was then dried at 100° C. for 8 hours to obtain a powder $B^{11}$.

As a result of the composition analysis of the powder $B^{11}$, it was found that the molar ratio of Li:Ni:Mn:Fe was 1.26:0.47:0.48:0.05. Furthermore, the powder $B^{11}$ had a BET specific surface area of 5.9 $m^2/g$, and the particle diameter of primary particles in SEM observation of the powder $B^{11}$ was 0.1 μm in average. As a result of the powder X-ray diffraction measurement, the crystal structure of the powder $B^{11}$ was a layered structure belonging to the R-3m space group.

2. Discharge Rate Test of Nonaqueous Electrolyte Secondary Battery

A coin type battery was produced by using the powder $B^{11}$ as a positive electrode active material, and a discharge rate test of the battery was carried out to find that the discharge capacities (mAh/g) at 0.2 C, 1 C, 5 C and 10 C were 145, 136, 120, and 108, respectively, and the discharge capacity retention ratios (%) thereof were 100, 94, 82, and 74, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Example 12

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.96 g of nickel(II) chloride hexahydrate, 11.87 g of manganese(II) chloride tetrahydrate, and 1.24 g of iron(II) chloride tetrahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.87 g of the coprecipitate, 1.72 g of lithium hydroxide monohydrate and 2.69 g of $NaNO_3$ (the amount of the inactive flux $NaNO_3$ was 59 parts by weight per 100 parts by weight of the lithium mixed metal oxide raw material) were dry mixed to obtain a mixture. Next, the mixture was placed in an alumina calcination container, calcined by maintaining it in an air atmosphere at 300° C. for 6 hours using an electric furnace and then cooled to room temperature to obtain a calcined article. The calcined article was pulverized to obtain a pulverized article, the pulverized article was washed with distilled water by decantation and filtered to obtain a solid, and then the resultant solid was dried at 100° C. for 8 hours to obtain a powder $B^{12}$.

As a result of the composition analysis of the powder $B^{12}$, it was found that the molar ratio of Li:Ni:Mn:Fe was 0.52:0.47:0.48:0.05. Furthermore, the powder $B^{12}$ had a BET specific surface area of 74.5 $m^2/g$, and the particle diameter of primary particles in SEM observation of the powder $B^{12}$ was 0.05 μm in average. As a result of the powder X-ray diffraction measurement, the crystal structure of the powder $B^{12}$ was a layered structure belonging to the R-3m space group.

2. Discharge Rate Test of Nonaqueous Electrolyte Secondary Battery

A coin type battery was produced by using the powder $B^{12}$ as a positive electrode active material, and a discharge rate test of the battery was carried out to find that the discharge capacities (mAh/g) at 0.2 C, 1 C, 5 C and 10 C were 110, 86, 40, and 22, respectively, and the discharge capacity retention ratios (%) thereof were 100, 79, 36, and 20, respectively. The discharge capacity and the discharge capacity retention ratio in 10 C of the battery were respectively higher than the discharge capacity and the discharge capacity retention ratio in 10 C of a coin type battery using a powder $A^1$ in the below-mentioned Comparative Example 1 as a positive electrode active material.

Comparative Example 1

1. Production of Layered Structure Lithium Mixed Metal Oxide

In a polypropylene beaker, 83.88 g of potassium hydroxide was added to 200 ml of distilled water and then potassium hydroxide was dissolved while stirring to obtain an aqueous potassium hydroxide solution (aqueous alkali solution). In a glass beaker, 13.90 g of nickel(II) chloride hexahydrate, 13.95 g of manganese(II) chloride tetrahydrate, and 4.05 g of iron(II) chloride hexahydrate were added to 200 ml of distilled water, and dissolved while stirring to obtain an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, and washed with distilled water, and then the resultant solid was dried at 100° C. to obtain a coprecipitate (hydroxide of a transition metal element). Using an agate mortar, 2.00 g of the coprecipitate and 1.16 g of lithium hydroxide monohydrate were dry mixed to obtain a mixture (no inactive flux is contained in the mixture). Next, the mixture was placed in an alumina calcination container, calcined by maintaining it in an air atmosphere at 900° C. for 6 hours using an electric furnace and then cooled to room temperature to obtain a calcined article. The calcined article was pulverized to obtain a pulverized article, the pulverized article was washed with distilled water by decantation and filtered to obtain a solid, and then the resultant solid was dried at 100° C. for 8 hours to obtain a powder $A^1$.

As a result of the composition analysis of the powder $A^1$, it was found that the molar ratio of Li:Ni:Mn:Fe was 1.30:0.41:0.49:0.10. Furthermore, the powder $A^1$ had a BET specific surface area of 0.3 $m^2/g$, and the particle diameter of primary particles in SEM observation of the powder $A^1$ was 0.7 μm in average. As a result of the powder X-ray diffraction measurement, the crystal structure of the powder $A^1$ was a layered structure belonging to the R-3m space group.

2. Discharge Rate Test of Nonaqueous Electrolyte Secondary Battery

A coin type battery was produced by using the powder $A^1$ as a positive electrode active material, and a discharge rate test was carried out to find that the discharge capacities (mAh/g) at 0.2 C, 1 C, 5 C and 10 C were 76, 51, 22, and 14, respectively, and the discharge capacity retention ratios (%) thereof were 100, 67, 29, and 18, respectively. The discharge capacity and the discharge capacity retention ratio in 10 C of the coin type battery using the powder $A^1$ were not satisfactory.

Comparative Example 2

1. Production of Layered Structure Lithium Mixed Metal Oxide

By using a coprecipitate obtained by the same method as in Comparative Example 1 (hydroxide of a transition metal element), 2.85 g of the coprecipitation, 2.32 g of lithium carbonate, 0.13 g of lithium chloride (the amount of lithium chloride is 2.5 parts by weight per 100 parts by weight of the lithium mixed metal oxide raw material) are dry mixed by using an agate mortar to obtain a mixture (no inactive flux is contained in the mixture). Next, as in Comparative Example 1, the mixture was calcined, and from the resultant calcined product, powder $A^2$ is obtained as in Comparative Example 1.

Similar to the powder $A^1$, the BET specific surface area of the powder $A^2$ is smaller than that in the powder obtained in each of Examples 1 to 12, and the average value of the particle diameter of the primary particles in the powder $A^2$ is larger than that in the powder obtained in each of Examples 1 to 12.

2. Discharge Rate Test of Nonaqueous Electrolyte Secondary Battery

When a coin type battery is produced by using the powder $A^2$ as a positive electrode active material and a discharge rate test of the battery is carried out, the discharge capacity and the discharge capacity retention ratio in 10 C of the battery are smaller as compared with the discharge capacity and the discharge capacity retention ratio in 10 C of the battery in Examples 1 to 12, which is similar to Comparative Example 1.

Production Example 1

Production of Laminated Film (1) Production of Coating Fluid

Calcium chloride (272.7 g) was dissolved in 4200 g of NMP, and then 132.9 g of para-phenylenediamine was added and dissolved completely. To the resultant solution, 243.3 g of terephthalic acid dichloride was gradually added and polymerization thereof was carried out to obtain a para-aramide, and this was diluted further with NMP to obtain a para-aramide solution (A) having a concentration of 2.0% by weight. To 100 g of the resultant para-aramide solution, 2 g of an alumina powder (a) (manufactured by Nippon Aerosil Co., Ltd., Alumina C, average particle diameter: 0.02 μm) and 2 g of an alumina powder (b) (Sumicorandom AA03 manufactured by Sumitomo Chemical Co., Ltd., average particle diameter 0.3 μm) were added as a filler in a total amount of 4 g, and these were mixed and treated three times by a nanomizer, and further, filtered through a 1000 mesh wire netting, and defoamed under reduced pressure to produce a slurry-formed coating fluid (B). The weight of the alumina powders (filler) with respect to the total weight of the para-aramide and the alumina powders was 67% by weight.

(2) Production and Evaluation of Laminated Film

A polyethylene porous film (thickness: 12 μm, air permeability: 140 second/100 cc, average pore size: 0.1 μm, porosity: 50%) was used as the porous film. On a PET film having the thickness of 100 μm, the above-mentioned polyethylene porous film was fixed, and the slurry-form coating fluid (B) was applied on the porous film by a bar coater manufactured by Tester Sangyo Co., Ltd. The PET film integrated with the applied porous film was immersed into water that was a poor solvent to allow a para-aramide porous layer (heat resistant porous layer) to precipitate, and then the solvent was dried to yield a laminated film 1 which had a heat resistant porous layer and a porous film laminated to each other. The thickness of the laminated film 1 was 16 μm, and the thickness of the para-aramide porous film (heat resistant porous layer) was 4 μm. The laminated film 1 had an air permeability of 180 second/100 cc, and a porosity of 50%. The cross section of the heat resistant porous layer in the laminated film 1 was observed by a scanning electron microscope (SEM) to find that relatively small micropores of around from 0.03 μm to 0.06 μm and relatively large micropores of around from 0.1 μm to 1 μm were present. The evaluation of the laminated film was carried out as follows.
<Evaluation of Laminated Film>
(A) Measurement of Thickness The thickness of the laminated film and the thickness of the porous film were measured according to JIS standard (K7130-1992). As the thickness of the heat resistant porous layer, a value obtained by subtracting the thickness of the porous film from the thickness of the laminated film was used.
(B) Measurement of Air Permeability by Gurley Method The air permeability of the laminated film was measured by digital timer mode Gurley type Densometer manufactured by Yasuda Seiki Seisakusho Ltd., according to JIS P8117.
(C) Porosity A sample of the resultant laminated film was cut into a square having a side length of 10 cm, and the weight W (g) and the thickness D (cm) thereof were measured. The weights (Wi (g)) of the respective layers in the sample were measured, and the volumes of the respective layers were calculated from Wi and the true specific gravities (true specific gravity i (g/cm$^3$)) of the materials of the respective layers, and the porosity (vol %) was calculated according to the following formula.

Porosity (vol %)=100×{1−($W$1/true specific gravity 1+$W$2/true specific gravity 2+ . . . +$Wn$/true specific gravity $n$)/(10×10×$D$)}

In each of the above-mentioned examples, a lithium secondary battery capable of increasing thermal film breaking temperature can be obtained when the laminated film produced in the Production Example 1 is used as a separator.

INDUSTRIAL APPLICABILITY

According to the present invention, it is possible to obtain a layered structure lithium mixed metal oxide having particulates and high crystalline property. Use of the layered structure lithium mixed metal oxide can give a nonaqueous electrolyte secondary battery capable of exhibiting high output at a high current rate. The secondary battery is useful for applications of use in which high output at a high current rate is required, that is, a nonaqueous electrolyte secondary battery for automobile or for power tools, such as electric tools.

The invention claimed is:

1. A method of producing a layered structure lithium mixed metal oxide, comprising a step of calcining a lithium mixed metal oxide raw material comprising a transition metal element and a lithium element in a molar ratio of the lithium element to the transition metal element of 1 or more and 2 or less, in the presence of an inactive flux comprising $Na_2CO_3$ or $K_2CO_3$ or both, and a step of removing the inactive flux from the resultant after the calcination, by washing the resultant with distilled water.

2. The method according to claim 1, wherein the lithium mixed metal oxide raw material is a mixture of a compound of lithium and a compound of the transition metal element.

3. The method according to claim 2, wherein the compound of the transition metal element comprises Fe.

4. The method according to claim 3, wherein the compound of the transition metal element further comprises one or more elements selected from the group consisting of Ni, Mn and Co.

5. The method according to claim 1, wherein the inactive flux is present in an amount of 0.1 parts by weight or more and 100 parts by weight or less per 100 parts by weight of the lithium mixed metal oxide raw material at the commencement of calcination.

6. The method according to claim 1, wherein a temperature of the calcination is in a range of from 200° C. to 1050° C.

* * * * *